United States Patent [19]
Sander

[11] 3,945,631
[45] Mar. 23, 1976

[54] FLY TYING VISE

[76] Inventor: Glen L. Sander, 9034 El Measa Court, Elk Grove, Calif. 95624

[22] Filed: Mar. 31, 1975

[21] Appl. No.: 563,338

[52] U.S. Cl. .............................. 269/131; 269/236
[51] Int. Cl.² .......................................... B25B 1/20
[58] Field of Search ........... 269/130, 131, 132, 196, 269/236; 81/65

[56] References Cited
UNITED STATES PATENTS

| 989,794 | 4/1911 | Mueller | 269/130 |
|---|---|---|---|
| 2,196,623 | 4/1940 | Brewington | 269/196 |
| 2,522,190 | 9/1950 | Mouser | 81/65 |

FOREIGN PATENTS OR APPLICATIONS

| 887,026 | 7/1949 | Germany | 269/130 |
|---|---|---|---|
| 1,089,148 | 9/1954 | France | 81/65 |
| 8,693 | 6/1906 | United Kingdom | 269/131 |

*Primary Examiner*—Al Lawrence Smith
*Assistant Examiner*—Robert C. Watson
*Attorney, Agent, or Firm*—Lothrop & West

[57] ABSTRACT

A C-shaped framework includes an upright post and an outwardly projecting anvil on top of the post, the top surface of the anvil being slotted to receive the bight of a fish hook and thus orient the eye of the hook in a direction such that fly material can conveniently be attached to the hook. A tightening band includes a loop which extends over the bight of the hook and thus selectively secures a hook positioned in the anvil slot. The band is connected to a drawing stem translatably disposed in an outwardly projecting bearing block forming the bottom of the C-shaped framework. The lower end of the drawing stem projects downwardly below the bottom surface of the bearing block and has a transverse axle mounted thereon. A cam eccentrically journaled on the axle is rotated by a lever. In one direction of rotation of the cam, the drawing stem and attached band are free to be moved upwardly to release the hook; in the opposite direction of cam rotation, the cam bears against the bottom surface of the bearing block and by reaction translates the drawing stem in a downward direction so that the band loop tightly clamps the bight of the fish hook against the anvil. The effective length of the drawing stem can be adjusted for different hook sizes.

6 Claims, 3 Drawing Figures

FLY TYING VISE

BACKGROUND OF THE INVENTION

The market place as well as the patent literature disclose various kinds of tools for temporarily securing small articles to facilitate fine work. Exemplary is U.S. Pat. No. 989,794, granted Apr. 18, 1911 to E. F. Mueller. In addition, sporting goods catalogs offer several kinds of fly tying devices. There is, however, considerable room for improvement.

SUMMARY OF THE INVENTION

The invention relates to vises which temporarily hold fish hooks in the desired attitude and orientation while affixing to the hooks small, precisely cut and shaped pieces of fur, feathers, and the like, to form an artificial fly. Many people enjoy making their own flies and it is among this group that the present device finds its greatest utility.

To this end, it is an object of the invention to provide a fly tying vise which is small in size, light in weight and compact in configuration yet quickly and reliably positions a fish hook for tying.

It is another object of the invention to provide a fly tying vise which is relatively inexpensive, has but few moving parts to get out of order and is versatile in that it is capable of handling fish hooks of a wide range of sizes.

It is a further object of the invention to provide a fly tying vise which can either be mounted on a bench, table, chest, or the like, or which, if desired, can conveniently be held in one hand while tying is effected.

It is another object of the invention to provide a generally improved fly tying vise.

Other objects, together with the foregoing, are attained in the embodiment described in the following and illustrated in the accompanying drawing.

SHORT DESCRIPTION OF THE FIGURES

DETAILED DESCRIPTION OF PREFERRED EMBODIMENT

Figures 1, 3:
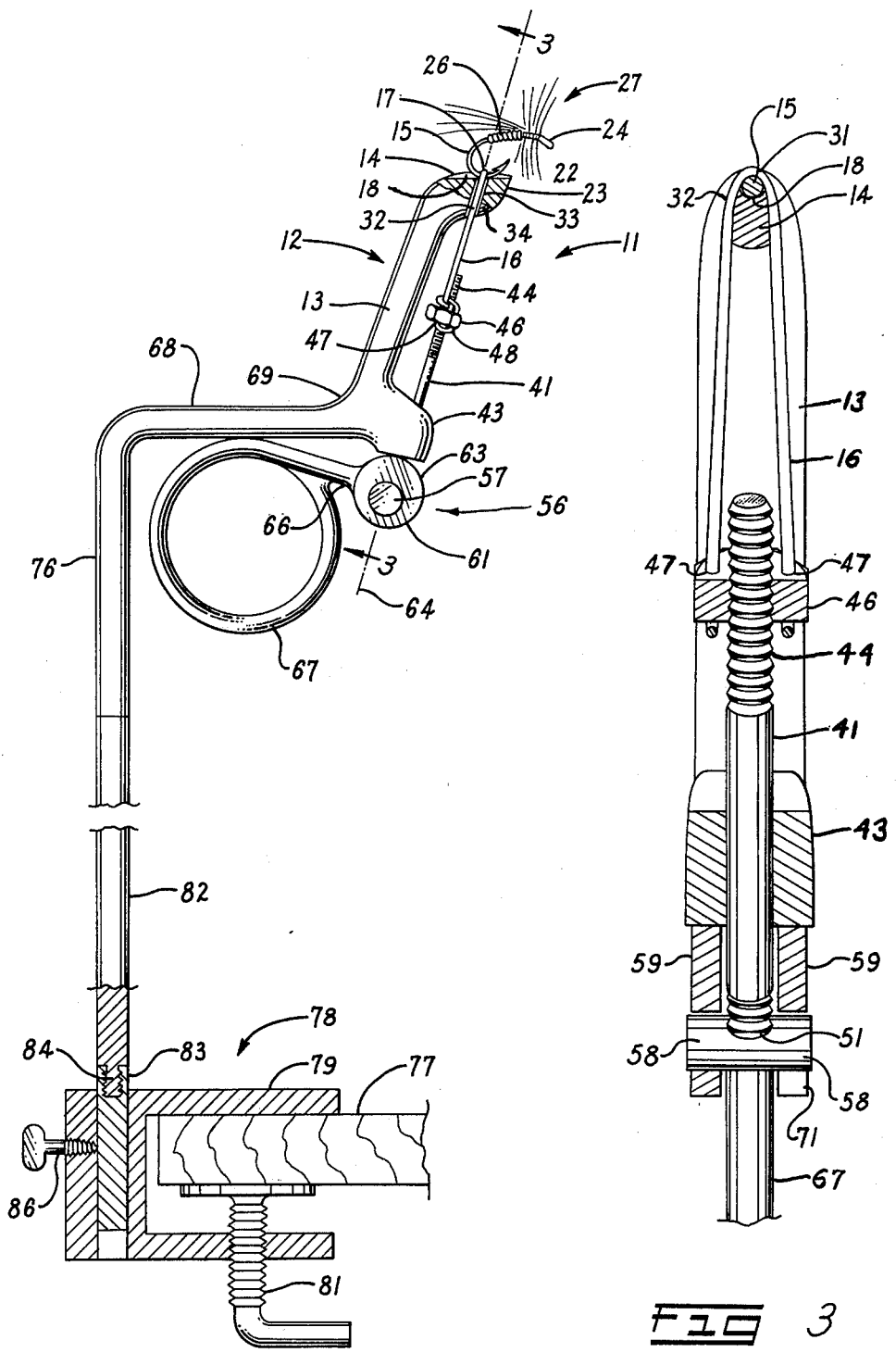
FIG. 1 is a side elevational view of the device mounted on a table clamp, the clamp being shown in section, and with the fish hook clamping loop in locked position.
FIG. 3 is a fragmentary sectional view of the loop tensioning mechanism, to a greatly enlarged scale, the plane of the section being indicated by the line 3—3 in FIG. 1.

While the fly tying vise of the invention is susceptible of numerous different physical embodiments, depending upon the environment and requirements of use, numerous of the herein shown and described embodiments have been made and used, and all have performed in an eminently satisfactory manner.

The fly tying vise of the invention, generally designated by the reference numeral 11, comprises a generally C-shaped frame 12 including an upright post 13 surmounted by a transversely oriented and cantilevered anvil 14 on which a fish hook 15 can be selectively clamped or released by a translatable band 16 of piano wire. The upper end of the band includes a clamping loop 17.

A longitudinal slot 18 in the top surface 19 of the anvil facilitates the proper orientation of the fish hook 15 so that when the bight portion 21 of the fish hook adjacent the barb 22 is aligned with and located within the slot 18, with the barb 22 adjacent the nose end 23 of the anvil, the eye 24 at the end of the shank 26 of the hook extends well beyond the anvil. This permits the user conveniently to lash to the hook the various bristles, feathers and the like, which provide a fly 27 similar to that shown in FIG. 1.

The wire loop 17 preferably includes an arcuate bight 31 arching over the bight portion 21 of the hook; and extending downwardly from the bight 31 of the loop 17 on each side 34 of the anvil is a pair of legs 32.

The wire legs 32 are guided in their vertical to and fro movement by respective grooves 33 formed in the opposite sides 34 of the anvil. As appears most clearly in FIGS. 1 and 2, the angle of the guide grooves 33 is not necessarily perpendicular to the anvil slot 18 but can be on the order of 65° – 70°, or so, relative to the axis of the longitudinal anvil slot 18.

Figure 2:
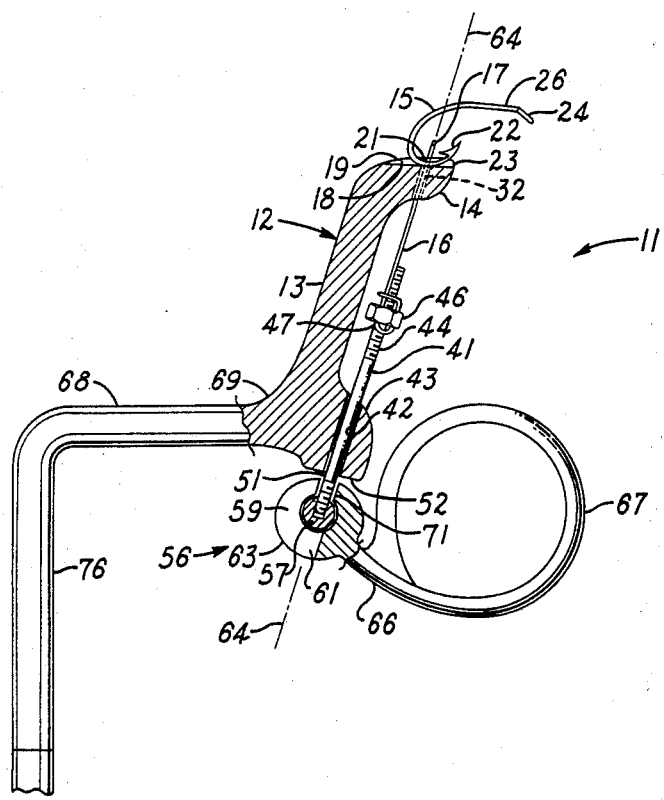
FIG. 2 is a fragmentary side elevation of the device showing the fish hook clamping loop in unlocked position, and with portions of the device shown in section to disclose the details of the band length adjusting structure.

Initially, the wire band 16 is located in an elevated position, as shown in FIG. 2, so that the clamping loop 17 is spaced above the anvil 14. The hook 15 is thereupon located in the slot 18 in the orientation and attitude as illustrated. At this juncture, the band 16 is translated downwardly to a lower position, as appears in FIG. 1, in which the bight 31 of the wire loop 17 engages and bears tightly downwardly on the bight portion 21 of the hook 15 interposed between the loop 17 and the anvil 14.

Downward translation of the wire band 16 and clamping loop 17 is provided by a drawing stem 41 translatably disposed in a bore 42 formed in a bearing block 43 mounted on and cantilevered outwardly from the bottom of the upright post 13, the bearing block 43 forming with the upright post 13 and the cantilevered anvil 14, the C-shaped frame 12 referred to above.

The upper portion of the drawing stem 41 is provided with threads 44 engaged by an adjustment nut 46 serving as an anchor for the lower ends of the two wire legs of the locking band 16.

Conveniently, two pairs of holes 47 and 48 are drilled through the nut 46 so that two holes are located on each side of the drawing stem 41. The lower end portions of the wires on opposite sides of the stem pass downwardly through the first pair of holes 47, turn laterally and recurve to pass upwardly through the second pair of holes 48. Upon emerging from the second pair of holes 48, the wires are recurved toward and are bent 180° around the standing portion of the respective adjacent wires, thereby securing the two wires to the adjusting nut 46.

Although the drawing stem 41 could be translated downwardly by threading the lower end 51 of the drawing stem which protrudes downwardly below the bottom bearing surface 52 of the bearing block 43, and engaging the threaded lower end with a butterfly nut (not shown) so that the flat of the butterfly nut bears against the surface when being rotated (and thereby urging the stem downwardly) I prefer to use a cam actuated mechanism as illustrated in FIGS. 1–3, and generally designated by the reference numeral 56.

With the cam mechanism 56, downward force is exerted on the drawing stem 41 by a transverse axle 57 threadably connected to the lower end 51 of the stem 41, as appears most clearly in FIG. 2. The axle 57 includes a pair of oppositely extending end portions 58. The bifurcated portions 59 of a cam 61 are eccentrically journaled on the respective end portions 58 of the axle so that when the cam 61 is rotated from a first, hook release position shown in FIG. 2 toward a second, hook clamping position shown in FIG. 1, the cam periphery 63 moves into bearing engagement with the adjacent bottom surface 52 of the bearing block 43 and downwardly biases the axle 57, the drawing stem 41, the band 16 and the clamping loop 17 into locking engagement with the hook 15.

The cam is readily rotated by a cam lever 66 mounted thereon, the lever preferably being extended to form a ring 67 having a diameter such as to provide a secure hold to the user's finger. As can be seen most clearly in FIG. 1, the ring 67 abuts a limit stop boom 68, connected to the lower corner 69 of the C-shaped frame 12, when the clamping wire loop 17 is in lowermost, locked position. In this position, the user can insert a finger of one hand through the ring 67 and thereby assist in holding the cam in locked position while concurrently tying the fly with the thumb and remaining fingers of the gripping hand as well as the thumb and fingers of the other hand. It is to be noted that the cam contour is so arranged relative to the stem axis 64 that an over-center toggle action is attained, thereby locking the stem and loop 17 in hook clamping position.

In order to release the fish hook after the fly is completed, the cam lever 66 is moved in a counter-clockwise direction from the position shown in FIG. 1 to that shown in FIG. 2. There is some degree of resilience in the band so that to a slight extent the loop 17 lifts off the subjacent hook when the downward force on the drawing stem is relieved. The fly tied hook is thus released and can be removed in order to accommodate the next hook to be tied.

Should a fine, lengthwise adjustment of the drawing stem be desired, the cam 61 can readily be removed from the axle 57 by rotating the cam 61 to the position shown in FIG. 2 wherein a slot 71 formed in one of the bifurcations 59 is in registry with (i.e. in axial alignment with) the downwardly protruding lower end 51 of the drawing stem 41. At this juncture, the cam can be moved axially in a direction such that the slot 71 clears the lower end 51 of the stem, allowing the cam to be disengaged from the axle. The axle 57 can then be rotated one or more times through 180° in the desired direction so that the drawing stem 41 is moved axially relative to the nut 46, the wire band 16 and the clamping loop 17. This capability for longitudinal adjustment is especially useful when hooks of different sizes are to be worked on. After adjustment is effected, the cam is replaced on the axle by reversing the above-described procedure.

Although many fly tiers enjoy using merely the C-frame 12 and boom 68, or perhaps with an upright standard 76 on the end of the boom distant from the frame 12, there are others who like to mount the device rigidly on some supporting structure such as a table top 77, bench, chest, or the like. For these users a conventional table clamping structure 78 including a C-shaped channel 79, and screw clamp 81 can be utilized. Vertical positioning of the fly tying vise is afforded by extension members 82 and 83 connected by suitable threaded connectors 84, the bottom extension member being secured to the C-clamp by a set screw 86.

It can therefore be seen that I have provided a fly tying vise which is not only versatile, in that it can be adapted to a variety of circumstances, but it is also safe, reliable and convenient to operate.

What is claimed is:

1. A fly tying vise comprising:
  a. a C-shaped frame including
    1. an upright post,
    2. an anvil mounted as a cantilever on top of said post, and
    3. a bearing block mounted as a cantilever on the bottom of said post;
  b. a drawing stem translatably mounted on said bearing block, the axis of said drawing stem extending toward said anvil;
  c. a band mounted at its lower end on said drawing stem, the upper end of said band including a loop extending over at least a portion of said anvil, said loop being effective to clamp an interposed fish hook against said anvil in a lower position of said drawing stem and being capable of releasing the hook in an elevated position of said drawing stem, the top surface of said anvil being slotted to receive and orient the fish hook,
    said anvil including means for guiding the upper portion of said band in a predetermined path relative to the fish hook as said drawing stem is moved between said elevated position and said lower position, said guiding means including a spaced pair of grooves in said anvil parallel to said axis of said drawing stem,
    said loop including a bight and a spaced pair of legs depending from said bight, said legs of said loop sliding to and fro in said grooves as said drawing stem is moved between said elevated position and said lower position; and,
  d. means for translating said drawing stem between said elevated position and said lower position, said drawing stem extending through a bore in said bearing block and projecting downwardly beyond the bottom of said bearing block,
    said stem translating means including a transverse axle mounted on the lower end of said stem, and a cam eccentrically journaled on said axle, said cam being movable between a first position corresponding to said elevated position of said stem and a second position corresponding to said lower position of said stem, said cam bearing against the adjacent bottom surface of said bearing block as said cam is moved from said first position toward said second position, the reactive force of said bearing block against said cam being effective to urge said stem downwardly so that said loop is biased into clamping engagement with the fish hook as said cam reaches said second position,
    said axle including a pair of oppositely projecting end portions, said cam comprising a bifurcated pair of bearings journaled on said end portions of said axle, one of said bearings including a slot enabling said cam to be separated from said end portions by aligning the slot with said stem and axially moving said cam in a direction such that said stem passes through the slot until said cam disengages said axle.

2. A fly tying vise as in claim 1 including a lever mounted on said cam; and including means connected to said C-shaped frame for mounting said frame on a supporting base, said mounting means including a limit stop portion which is disposed in interfering relation with said cam lever as said cam is urged by said lever into said second position of said cam.

3. A fly tying vise as in claim 2 in which at least a portion of said cam lever is of annular configuration having a size sufficient to receive a finger of the user.

4. A fly tying vise as in claim 1 including means for adjusting the longitudinal position of said band, said adjusting means comprising threads on said stem, a nut in threaded relation with said stem, and means for mounting said lower end of said band on said nut, said stem being axially movable relative to said nut by separating said cam from said axle and rotating said stem on its axis until said band is selectively repositioned.

5. A fly tying vise comprising:
 a. an upright post;
 b. an elongated anvil mounted as a cantilever on top of said post, the top surface of said anvil having a longitudinal slot to receive and orient the shank of a fish hook to be tied with a fly;
 c. a bearing block mounted as a cantilever on the bottom of said post and projecting outwardly therefrom in substantially the same direction as said anvil;
 d. a boom mounted as a cantilever on said post and projecting outwardly therefrom in a direction substantially opposite to that of said bearing block;
 e. a drawing stem translatably mounted on said bearing block, the axis of said stem intercepting said anvil;
 f. a tightening band including a loop having a bight passing over said anvil at right angles to said longitudinal slot, the ends of said bight being attached to said drawing stem;
 g. camming means connected to the end of said drawing stem remote from said loop and in engagement with said bearing block for translating said drawing stem between an elevated position wherein said bight is removed from the shank of a fish hook in said slot and a lowered position wherein said bight is in clamping engagement with the fish hook; and,
 h. a cam lever mounted on said camming means, said cam lever including a finger grip portion which abuts said boom as a limit stop as said cam lever is moved from a first location removed from said boom and corresponding to said elevated position of said drawing stem to a second position corresponding to said lowered position of said drawing stem.

6. A fly tying vise as in claim 5 in which said abutting portion of said cam lever is a ring having a size sufficient to receive a finger of the user.

* * * * *